March 5, 1968  H. E. MELTZER  3,371,975
COOLING AND CARRYING BOX FOR ELECTRIC TOOLS AND APPLIANCES
Filed Feb. 21, 1967  2 Sheets-Sheet 1

INVENTOR
HENRY E. MELTZER

BY

GEORGE W. WRIGHT, JR.

March 5, 1968  H. E. MELTZER  3,371,975
COOLING AND CARRYING BOX FOR ELECTRIC TOOLS AND APPLIANCES
Filed Feb. 21, 1967  2 Sheets-Sheet 2
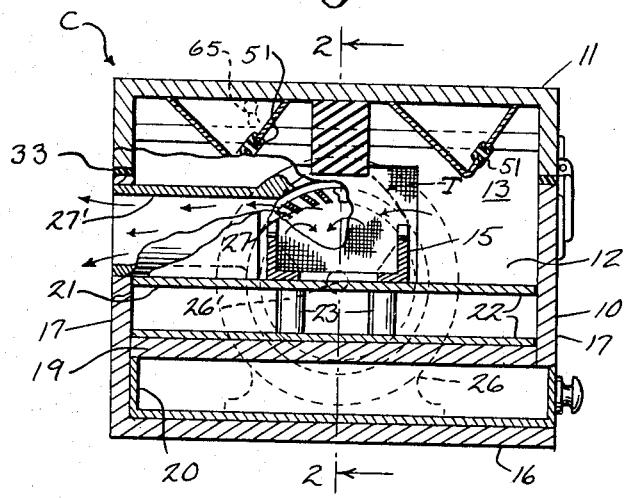
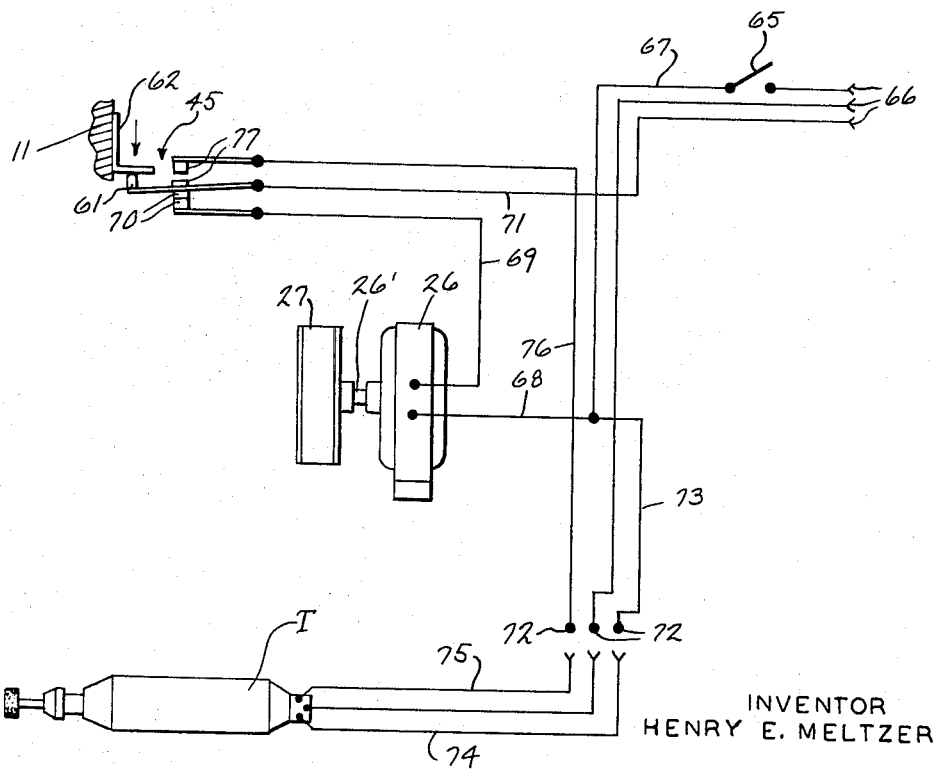
INVENTOR
HENRY E. MELTZER
BY
GEORGE W. WRIGHT, JR.

United States Patent Office 3,371,975
Patented Mar. 5, 1968

3,371,975
COOLING AND CARRYING BOX FOR ELECTRIC TOOLS AND APPLIANCES
Henry E. Meltzer, 1745 Flett St., Racine, Wis. 53403
Filed Feb. 21, 1967, Ser. No. 617,558
5 Claims. (Cl. 312—236)

ABSTRACT OF THE DISCLOSURE

An apparatus and cooling box for holding, carrying and cooling portable electrically driven tools and appliances such as barber clippers, small electric drills, grinders, etc. The box being of a substantially rectangular shape having a hinged lid at its upper end. A compartment in said box and electric motor carrying a suction fan adjacent one end of said compartment. The wall opposite the motor and suction fan being provided with a screened aperture. The appliance being set in the compartment between the aperture and motor and switch actuating means operable by the opening and closing of the lid to start the motor when the lid is closed and to circulate air about the appliance for cooling the same. The box being also provided with an exhaust opening adjacent the suction fan. The electric circuit arrangement also providing means whereby the source of current to the electric appliance can be cut off when the lid is closed and electric motor actuated.

---

Figure 1:
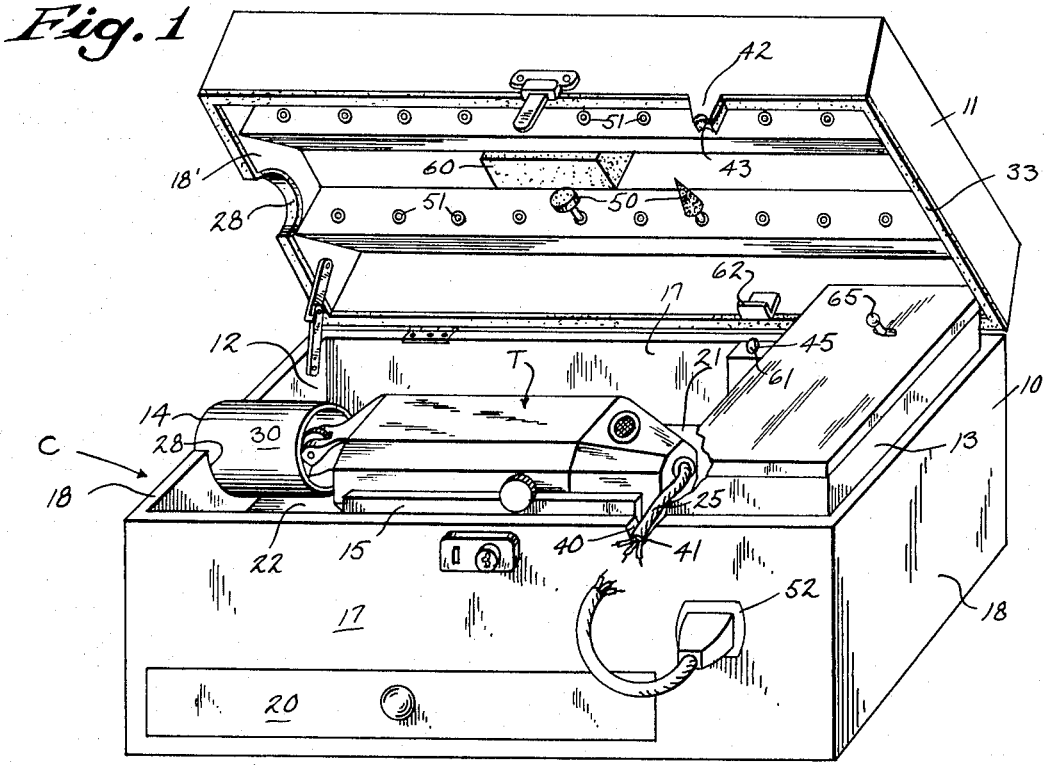

This invention appertains to the care and preservation of electric tools, and more particularly to new and useful improvements in a cooling box for holding, carrying and cooling portable electric tools.

In using electrically driven portable tools and appliances, such as barber clippers, small electric drills, grinders, etc., particularly where work is performed intermittently, and the tool or appliance is then set aside for a time and used again for a prolonged period, it has been found that the tools and electric motor may become overheated, or remain at a heated level for long periods of time. This is particularly true in the barber trade, where hair clippers are used intermittently on different customers, and the clipper tool as well as the motor often become excessively hot. The heated tool not only becomes uncomfortable for the customer, but also for the barber, and this prolonged heat lessens the life of the motor as well as the bearings and the tool per se. This, of course, is also true as aforementioned, where small portable electric drills and grinders are used.

It is, therefore, obvious that there is a great need for a means to cool the tool and motor when not in use, and put aside. To my knowledge, there is no convenient means or apparatus for accomplishing this purpose.

It is, therefore, a primary object of my present invention to provide a cooling box which not only acts as a holder and carrier for the portable tools and appliances but which will cool the tool and motor when the same is placed in the box and the cover closed.

A further important object of the present invention is to provide a novel circuit and switch means preferably operable by the cover whereby the electric motor for the tool will automatically be shut off and the cooling means actuated when the cover is closed and the box connected to a source of electrical current.

Another object of the present invention is to provide a cooling box carrying means for firmly holding the tool in position when the cover is closed and which can carry different work heads for the tools, as well as other appurtenances therefor.

A more specific object of my present invention is to provide a novel cooling box of a generally rectangular shape which is provided with a hinged cover to provide when the cover is closed a sealed compartment through which air may circulate upon actuation of a suction fan to draw air through the sealed compartment, and in and around the tool, the box being also provided with means for a novel electric circuit which allows the tool to function and operate when the lid is open, but which will automatically shut off the electric motor for the tool and actuate the electric motor for the suction fan when the lid is closed.

A further object of my present invention is to provide a novel removable floor section for the box carrying means about which the electric cord for the tool can be wound and stored, and one wall of the box or container being provided with a V-shaped notch having a rounded lower end for receiving a respective portion of the tool cord when the cover is closed, the cover having a mating portion to provide an effective seal.

A further object of my invention is to provide a simple, practical and reliable construction that is economical to manufacture, easy to assemble and positive in its operation.

With the above and other objects in view, as will more readily appear as the nature of the invention is better understood, the same consists in the novel construction, combination and arrangement of parts, hereinafter more fully described, illustrated and claimed.

Figure 2:
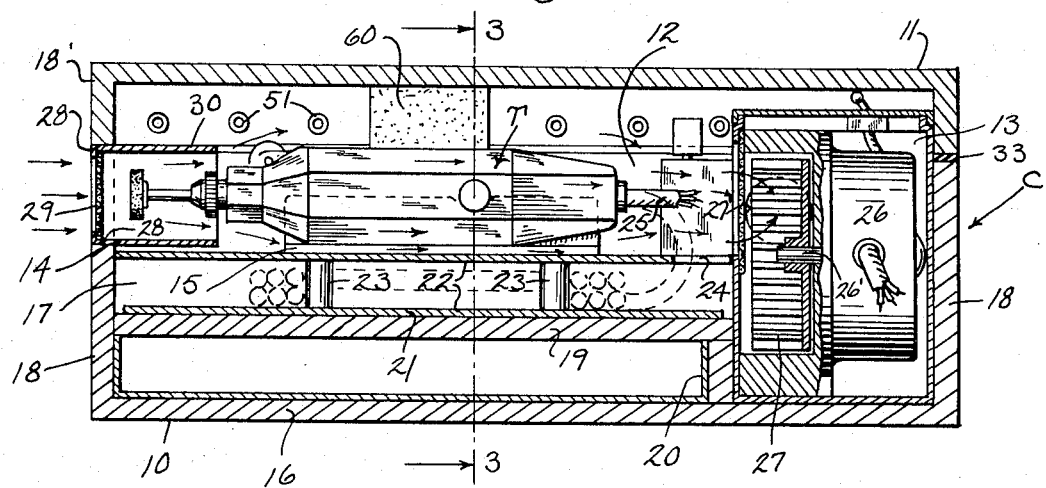

A preferred and practical embodiment of the invention is shown in the accompanying drawings, in which FIGURE 1 is an end elevational view in perspective of the new, improved cooling box with a tool in position and the cover being shown open;

FIGURE 2 is a longitudinal vertical section through the device shown in FIGURE 1 of the drawings, with the cover closed, and the section being represented by the line 2—2 of FIGURE 3 of the drawings, and looking in the direction of the arrows;

FIGURE 3 is a transverse vertical section taken on the line 3—3 of FIGURE 2 with certain other parts being broken away and in section to illustrate further details in its construction, and FIGURE 4 is a diagrammatic layout of one form of the circuit for alternately shutting off the electric motor for the tool and actuating the electric motor for the fan when the cover is closed, and conversely alternately starting the motor to the tool and closing off the motor to the fan when the lid or cover is opened.

A clearer understanding of the construction and method of operation of this invention may be had by referring to the drawings forming a part of this specification, wherein like reference characters designate corresponding or similar parts throughout the several views. The letter C generally indicates one type of my improved cooling and carrying box and the same includes broadly a substantially rectangular box 10 having a lid 11 so constructed and arranged as to provide an inner compartment 12, an end compartment 13, an aperture 14 and means 15 to position and hold an electric tool or appliance within the compartment 12.

The box 10 can be constructed of any desired materials and may be of any general configuration, but for the purposes of illustration, the same includes a bottom 16, side walls 17 and end walls 18. For a major portion of the inner part of the box I provide an elevated floor 19 and this assures space for the reception of a sliding drawer 20 which may be utilized to contain certain small tools and tool heads. Positioned above the elevated floor 19 is a false floor 21 constructed of spaced parallel extending plates 22 secured in spaced relation by means of posts 23. The posts 23 are placed inwardly from the peripheral edges of the plate and the plate is provided with a cut-out portion 24 through which the electric cord 25 of the appliance may extend and the remainder of the cord may be wrapped around the post 23 as shown more clearly in FIGURE 2, when the appliance is being stored and/or cooled. Adjacent one end and within the main structure 10 is the smaller compartment 13, and this compartment houses an electric motor 26 to the rotating shaft 26' of which is attached a suction fan 27. One end of the compartment adjacent the fan is open to allow air to be drawn in the direction of the arrows, FIGURE 2, and out a side wall through conduit 27', as shown more clearly in FIGURE 3 of the drawings. One end wall is provided with an aperture 28. This aperture is preferably covered with a screen 29 and provided with a cylindrical casing or tube 30 which extends within the compartment 12. The cover 11 is constructed in the general configuration of the rectangular box and the inner peripheral edge is provided with cushioning and sealing strips 33 which engage the upper peripheral edge of the side and end walls 17 and 18, respectively, of the box to form, except for the opening 28 and conduits 27', a closed sealed structure. The cylindrical or tubular housing 30 is as aforementioned, positioned in one of the end walls 18, as shown, and the adjacent wall 18' of the cover is likewise provided with an arcuate section to fit over and snugly close the sealed housing 30 when the cover is closed. The end wall 17 opposite where the wall to which the cover is hinged, is provided with a V-shaped notch 40 rounded at its lower end 41 to receive a respective portion of the electric cord 25 of the appliance when the lid or cover is closed and the lid or cover is likewise provided with an aligned correspondingly shaped depending projection 42 having a rounded end 43 to snugly receive the cord. Thus, a tight sealed fit for the device, so that the air drawn into the sealed compartment by the operation of the suction fan will follow generally the arrows in FIGURE 2, and there will be no other leaks to interfere with the proper circulation of the air which is vital to the cooling and care of the tool casing and motor of the appliance.

Also housed adjacent the point where the lid is hinged is a switch 45 which is connected in an electric circuit shown in FIGURE 4 of the drawings, and which will be explained in detail as the description proceeds, to both the motor for actuating the suction fan and to the motor for the appliance or tool. The switch is so arranged that when the lid is open as in FIGURE 1, current will be supplied to the electric appliance and the same may be operated as necessary, but when the lid is closed as shown in FIGURE 2 of the drawings, the circuit will be broken to the appliance and closed to the electric motor operating fan and thus the appliance will be automatically shut off and the fan automatically actuated. Within the cover or lid 11 I provide means for receiving and holding different types of tools and these tools are represented by the reference numerals 50 and for this purpose, V-shaped brackets are secured to the upper surface of the cover and these brackets are provided with resilient grommets 51 providing openings through which the shanks of the tools can be placed. The outlet receptacle 52 for the appliance is conveniently positioned on one side wall 17 as shown, and the receptacle for connection to the source of power is positioned on the opposite wall 17 (not shown). The electrical diagram for accomplishing the purpose stated, will now be described in detail, and for this attention is directed to FIGURE 4 of the drawings.

It should also be noted that secured to the inner surface of the lid 11 is a carrying and holding block 60 which rests against the tool T and holds the same in place when the lid is closed. This of course is of great advantage when the cooling box acts as a carrying case or the like. It should also be obvious that switch 45 includes an actuating button 61 and L-shaped bracket member 62 and is secured to the inner surface of the lid 11 for depressing the button. Normally the button is urged to its outward position and is moved to its inner position upon closing of the lid. A better understanding of the operation of the circuit as well as the automatic turning off of the tool T and actuation of the motor 25 and suction fan 27 can be had by referring to FIGURE 4 of the drawings. FIGURE 4 therefore illustrates one type of circuit diagram for accomplishing the shutting off of the current to the tool T and actuation of the motor 25. The tool T, motor 25, bracket 62 and button 61 of switch 45 are all indicated by reference numerals heretofore referred to and described in reference to FIGURES 1, 2 and 3 of the drawings. The circuit disclosed includes in all instances a third ground wire which is practical in use of commercial electric tools and the like. Also shown in the circuit and indicated by the numeral 65 is an "On" and "Off" switch and this switch is represented in FIGURE 1 and located preferably adjacent the top of the box 13. When switch 65 is open as illustrated no current from the source of supply will be had and the entire circuit will be inactive. However, when switch 65 is closed and the end leads 66 plugged in to a source of power, the circuit is energized and with the lid 11 closed it will be obvious that bracket 62 depresses the button 61 of switch 45 and closes the circuit to the motor 26 as follows: through line 67 to line 68 to the motor, through line 69 through the contact points 70 of switch 45 and line 71 to the source of power. Thus, the motor will be actuated and the suction fan 27 will rotate to draw air in the direction of the arrows, FIGURE 2, through the sealed chamber and thus cool both the tool and its motor. The tool of course is plugged in at 52 as noted in FIGURE 1 and these leads are indicated by the reference numeral 72. Current obviously will also flow through line 67 and line 73 and 74 to the tool, then out of the tool through line 75, line 76 to switch 45. Contact point 77 is now open and thus no current will flow to the tool motor and the tool is inoperative. Upon opening of the cover, however, the contact switch is urged normally to an upper position and therefore contact points 77 will close and current will flow through the tool to actuate the fan but will be cut off through line 69 to the tool motor and the motor will cease to operate the fan 27.

Therefore to utilize my novel cooling and carrying box it is only necessary to remove the cord 25' about the false bottom and plug it in at its connection 52. The On and Off switch is then actuated to its on position the cover opened as shown in FIGURE 1 and the tool used. When the tool is set in the frame within the compartment of the box, the tool head is placed within the cylindrical member 14. The lid is closed, switch 45 actuated by the depressing of the button 61, closing the circuit to the motor 26 and opening the circuit to the tool T. Thus the tool motor will cease to operate and suction fan 27 will begin to operate to draw air through and about the appliance and the tool to cool the same. In placing the tool in position, it should be noted that the cord can readily drop within the V slot in the rounded bottom thereof and portion 42 on the cover is provided with the sealed strip so that it will close tightly about the cord and no leaks will occur where the lid fits the box per se.

Thus, it can be seen that particularly in the barber trade, barbers may place their clippers within the sealed compartment when not in use and the clippers can be cooling to be ready for use again.

Thus, while I have shown and described certain specific embodiments of my invention, it will be understood that these embodiments are merely for the purpose of illustration and description, that various other forms may be devised, and that changes may be made in the proportions and minor details of construction without departing from the spirit of the invention or scope of the appended claims.

What is claimed as new is:

1. A cooling and carrying box for clippers and other electric tools including an outer casing so constructed and arranged as to provide an inner compartment, a hinged lid for said outer casing, sealing strips on the inner periphery of said lid, said lid when closed providing a sealed compartment within the main casing, an aperture in said casing adjacent one end of the same, a motor and suction fan adjacent the other end of said housing and within said sealed compartment, an aperture for the exhaust of air from the fan, means for holding and carrying a tool within said sealed compartment, a circuit within said housing having means to connect the circuit with a source of power, said tool and said motor for said suction fan being part of said circuit and switch means to automatically open the circuit to the motor and suction fan and close the circuit to the tool, said switch means being actuated by the opening and closing of said lid, the tool being in closed circuit with the source of power when the lid is open and inoperative when the lid is closed.

2. A cooling and carrying box for clippers and other electric tools as set forth in claim 1, wherein said aperture for the ingress of air carries a cylindrical housing and a screen within said housing being so constructed and arranged as to receive the head of the tool when the tool is placed within the compartment.

3. A cooling and carrying box for clippers and other electric tools as set forth in claim 1, wherein means is provided within the lid of the box to carry different work heads for the tool and wherein a false bottom is provided adjacent the sealed compartment to provide means for a sliding drawer.

4. A cooling and carrying box for clippers and other electric tools as set forth in claim 1, wherein said outer housing is of a substantially rectangular shape and wherein the suction fan and motor are carried within said housing adjacent one end and provided with a substantially rectangular shaped casing.

5. An appliance as set forth in claim 1, wherein means is provided for carrying the cord of the tool when the tool is placed within the sealed compartment for transporting from one place to another.

References Cited

UNITED STATES PATENTS

| | | | |
|---|---|---|---|
| 2,208,166 | 7/1940 | Sherron | 200—61.7 X |
| 2,284,905 | 6/1942 | Jackson | 98—51 X |
| 3,091,675 | 5/1963 | Sholtes | 200—61.62 |
| 3,192,306 | 6/1965 | Skonnord | 174—15 X |

CASMIR A. NUNBERG, *Primary Examiner*